(12) United States Patent
Perry

(10) Patent No.: US 8,786,551 B2
(45) Date of Patent: Jul. 22, 2014

(54) PREDICTIVE KEYPAD/KEYBOARD LIGHTING TO GUIDE INPUT

(75) Inventor: Paul O. Perry, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 961 days.

(21) Appl. No.: 12/332,652

(22) Filed: Dec. 11, 2008

(65) Prior Publication Data

US 2010/0149107 A1 Jun. 17, 2010

(51) Int. Cl.
*G06F 3/02* (2006.01)

(52) U.S. Cl.
USPC ............ 345/168; 345/156; 345/169; 345/170

(58) Field of Classification Search
USPC ............. 345/156, 168–171; 341/22; 715/700, 715/864
See application file for complete search history.

(56) References Cited

U.S. PATENT DOCUMENTS

| | | | | |
|---|---|---|---|---|
| 5,801,345 A * | 9/1998 | Mikula-Curtis et al. | ...... | 200/5 A |
| 5,963,671 A * | 10/1999 | Comerford et al. | ........... | 382/230 |
| 6,307,548 B1 * | 10/2001 | Flinchem et al. | ............. | 715/811 |
| 6,322,229 B1 * | 11/2001 | Chan et al. | ....................... | 362/85 |
| 6,573,844 B1 * | 6/2003 | Venolia et al. | ................... | 341/22 |
| 6,646,572 B1 * | 11/2003 | Brand | ............................. | 341/22 |
| 6,724,370 B2 * | 4/2004 | Dutta et al. | .................... | 345/169 |
| 6,731,227 B2 * | 5/2004 | Horie | ............................... | 341/22 |
| 7,333,031 B1 * | 2/2008 | Bantner | ......................... | 341/22 |
| 7,372,454 B2 * | 5/2008 | Betts-LaCroix | .............. | 345/168 |
| 7,403,188 B2 * | 7/2008 | Fux et al. | ........................ | 345/168 |
| 7,443,316 B2 * | 10/2008 | Lim | .................................. | 341/22 |
| 7,582,839 B2 * | 9/2009 | Kyowski et al. | .............. | 200/310 |
| 8,065,624 B2 * | 11/2011 | Morin et al. | ................... | 715/773 |
| 2006/0022951 A1 * | 2/2006 | Hull | ................................. | 345/168 |
| 2006/0247915 A1 | 11/2006 | Bradford et al. | .................. | 704/1 |
| 2007/0046641 A1 * | 3/2007 | Lim | ................................. | 345/173 |
| 2008/0001787 A1 * | 1/2008 | Smith et al. | ..................... | 341/23 |
| 2008/0158020 A1 * | 7/2008 | Griffin | ............................ | 341/22 |
| 2008/0212307 A1 * | 9/2008 | Chan et al. | ...................... | 362/85 |
| 2009/0277763 A1 * | 11/2009 | Kyowski et al. | .............. | 200/314 |

* cited by examiner

*Primary Examiner* — Jason Mandeville

(57) ABSTRACT

A device receives one or more input keys via a keypad associated with the device, where the keypad is separate from a display associated with the device. The device also determines one or more predicted words based on the received one or more input keys, and illuminates one or more keys associated with the keypad that correspond to one or more characters provided in the one or more predicted words.

21 Claims, 14 Drawing Sheets

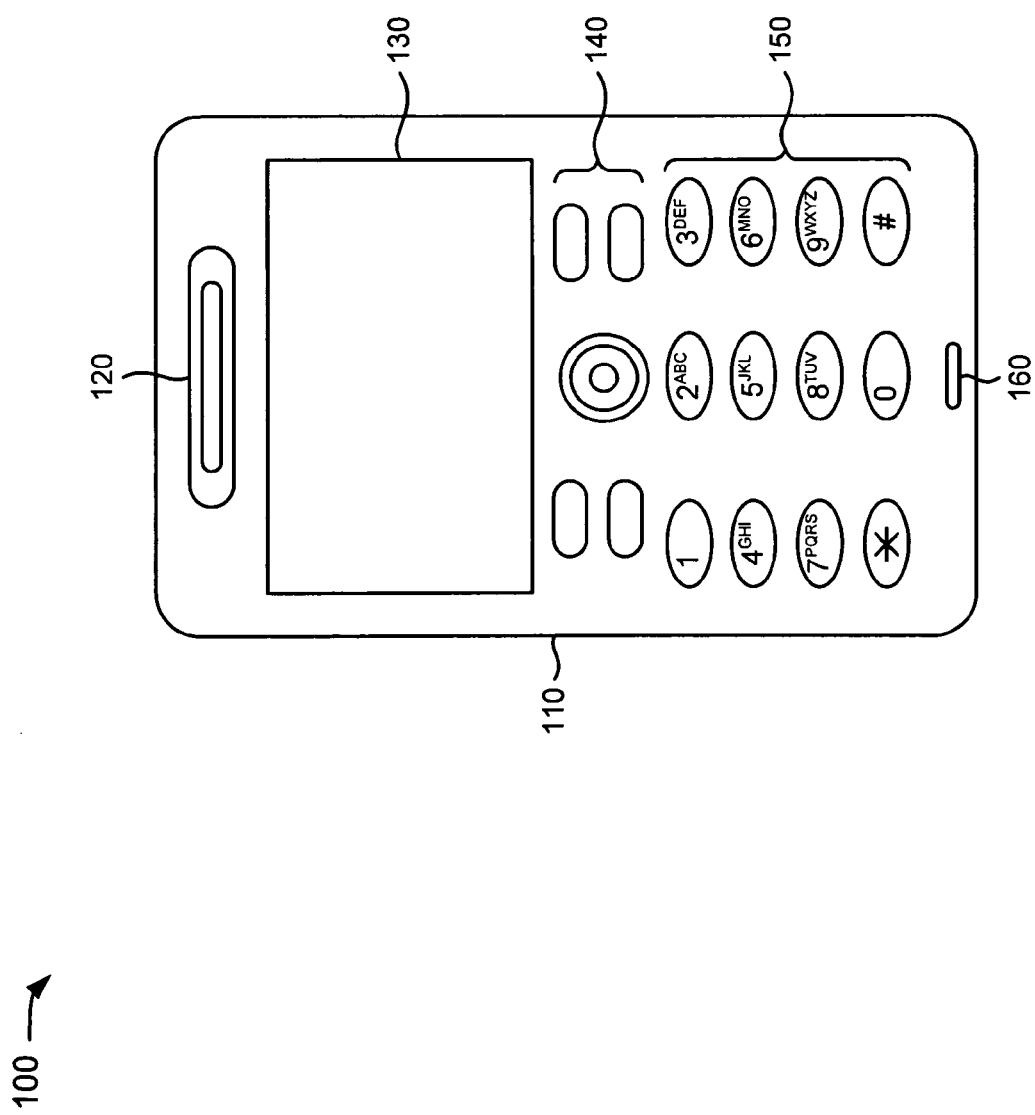

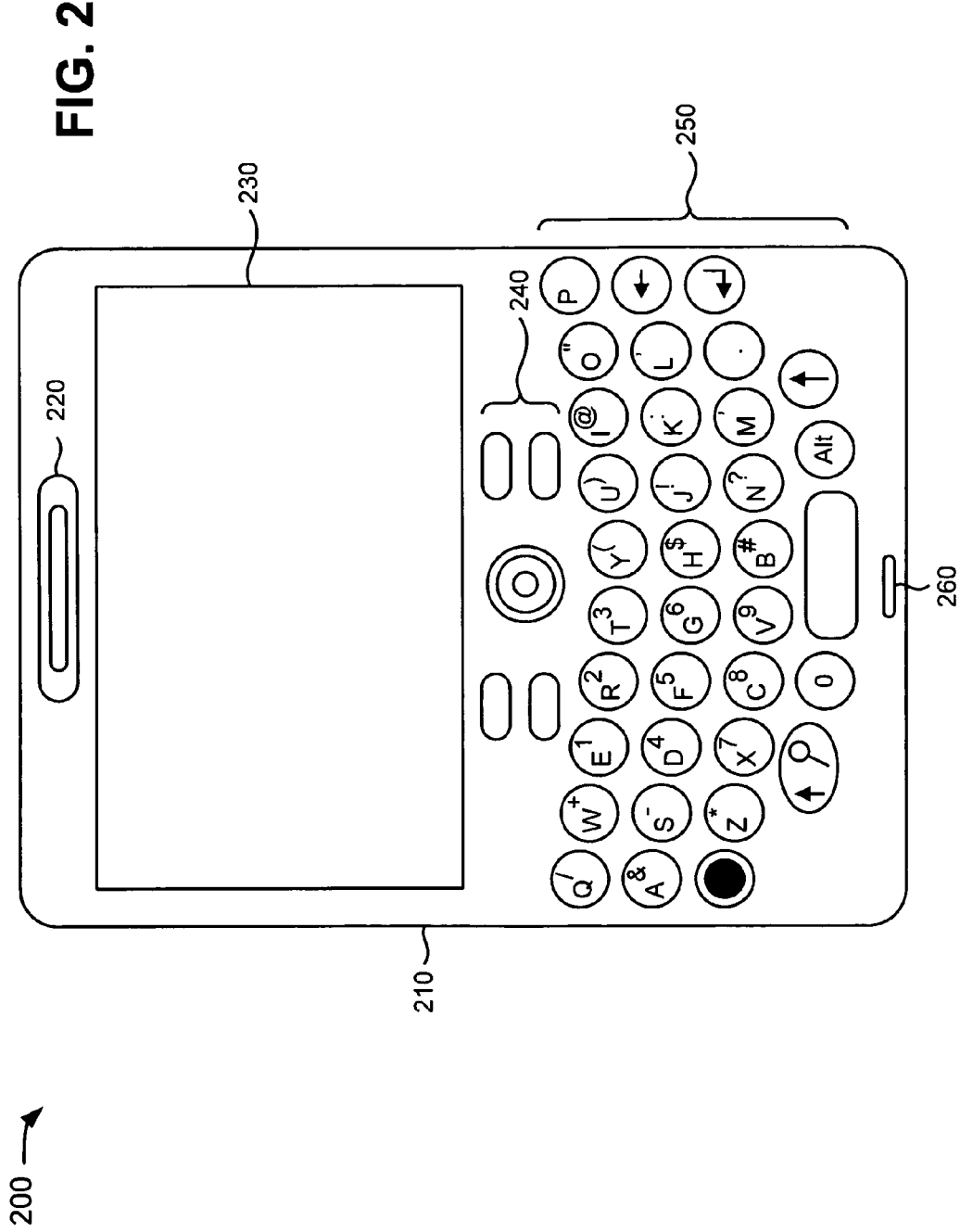

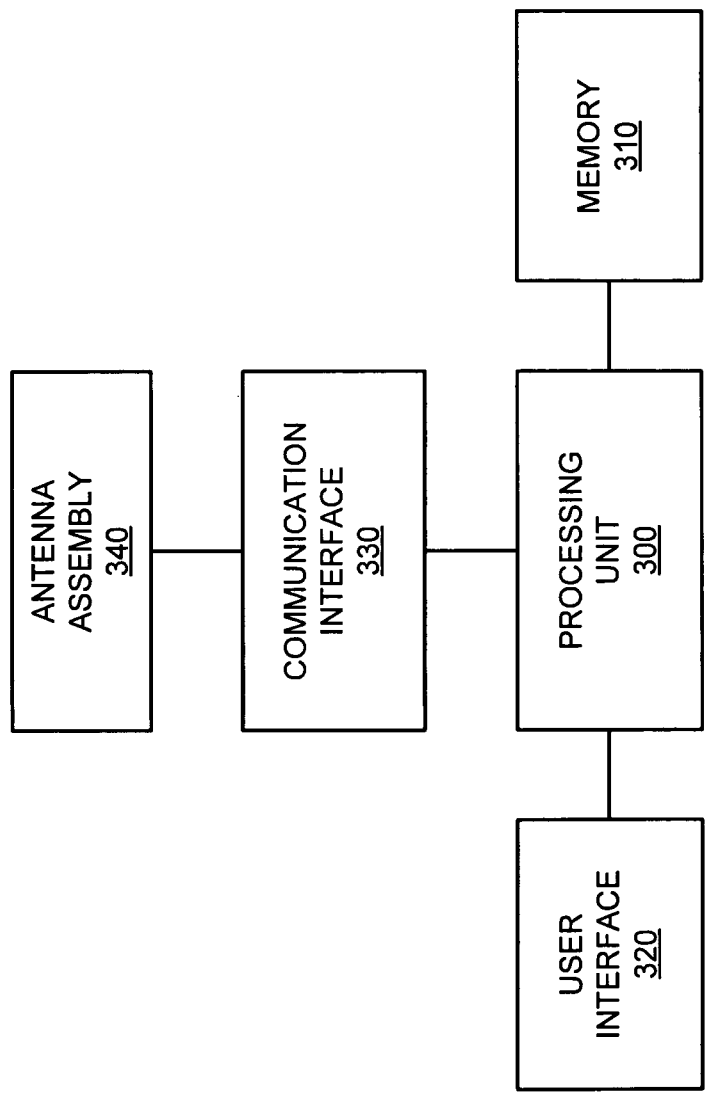

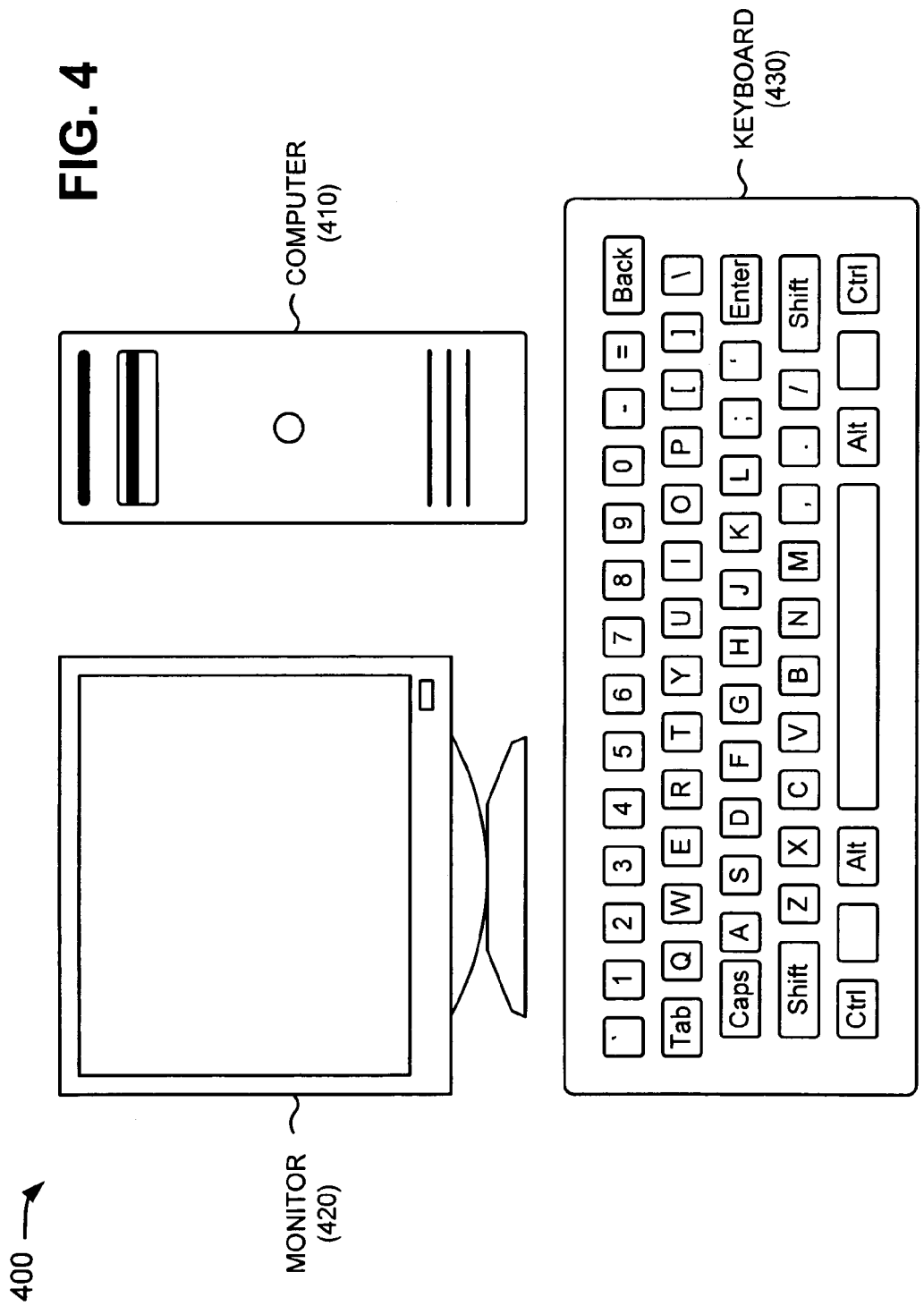

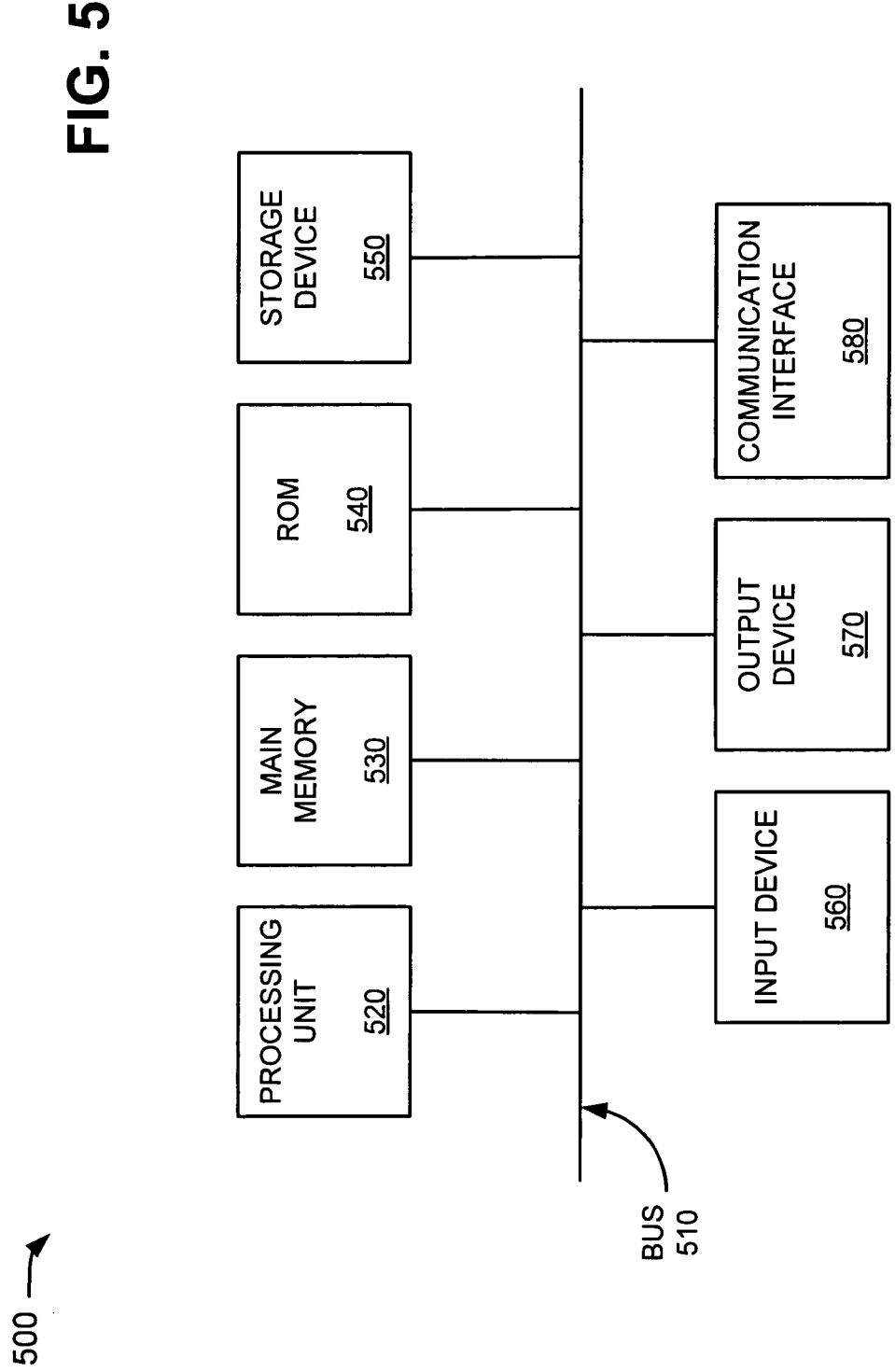

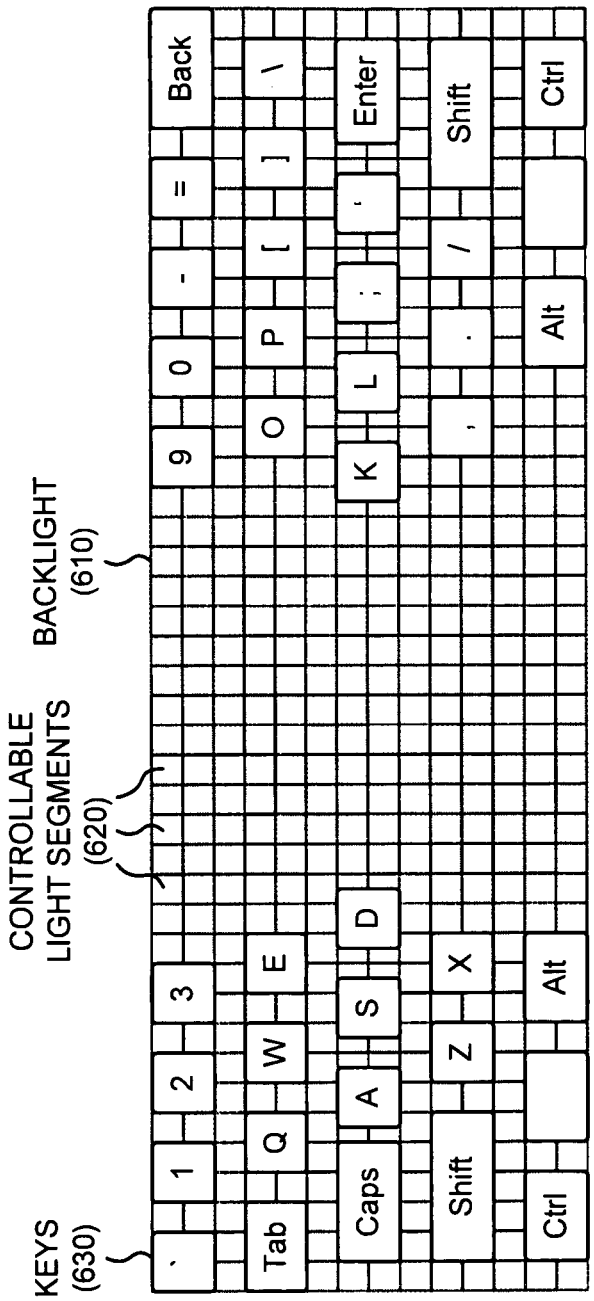

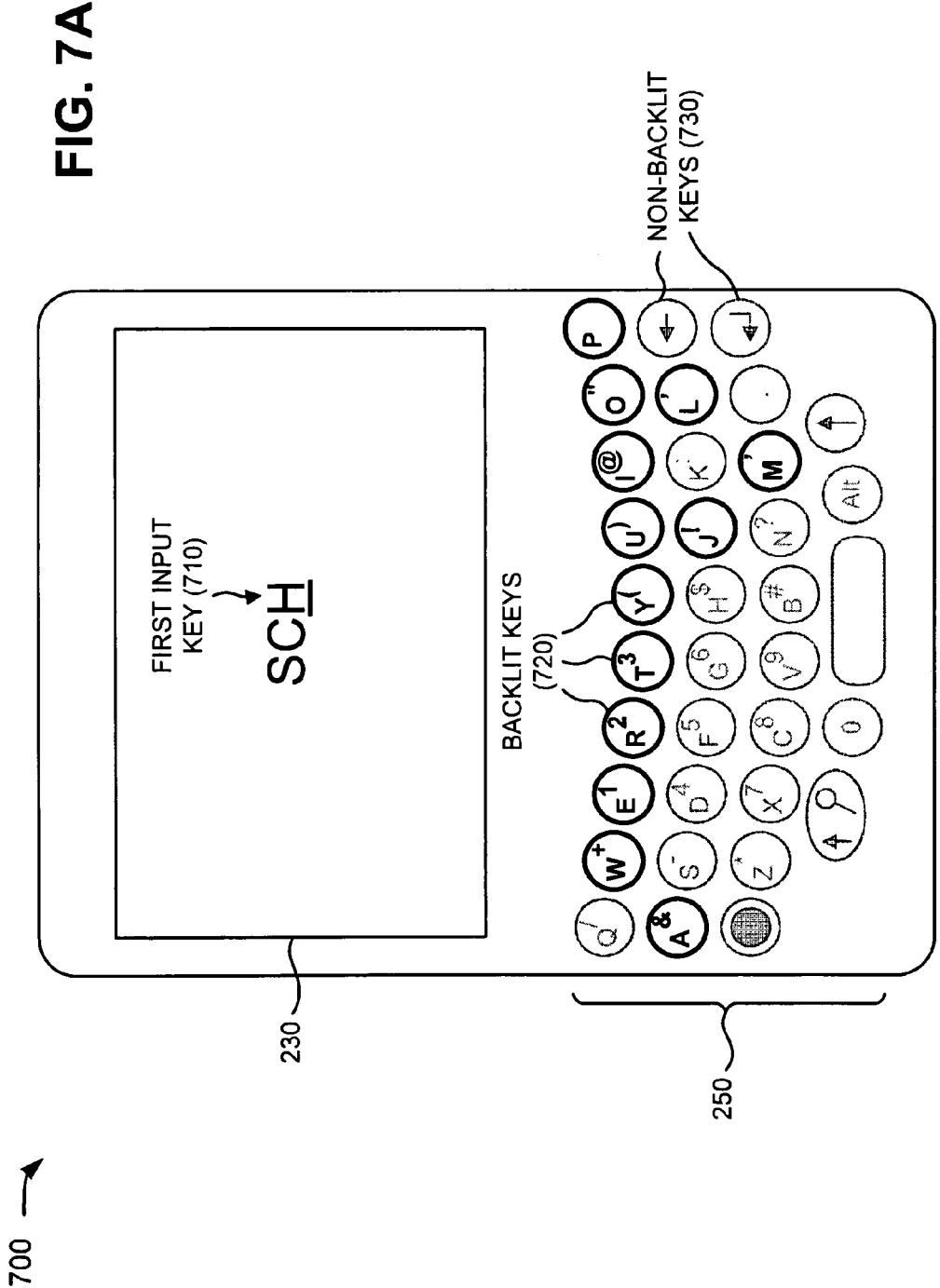

PREDICTIVE KEYPAD/KEYBOARD LIGHTING TO GUIDE INPUT

BACKGROUND

Predictive text is an input technology commonly used on mobile devices (e.g., cell phones, personal digital assistants (PDAs), etc.). The technology allows words to be entered with a single keypress for each letter, as opposed to the multiple keypress approach used in older generation mobile devices. The intent of predictive text is to simplify writing of text messages, e-mail messages, address book entries, calendar entries, etc.

In dictionary-based predictive text systems, as a user selects characters, the device associated with the user displays the selected characters via a device display. The device, via an algorithm, searches the dictionary for a list of possible words that match the selected characters, and displays (e.g., via the device display) a most probable word choice to the user. The user can confirm the word choice or use a key to cycle through possible word choices. Systems that use dictionary-based predictive text include Text on 9 keys (T9) technology, iTap, and eZiText. T9 technology combines groups of letters found on each key of an input device (e.g., a mobile telephone keypad) with a fast-access dictionary of words, and recognizes what a user wants to input as text as the user types.

BRIEF DESCRIPTION OF THE DRAWINGS

FIG. 1 depicts a diagram of an exemplary device in which systems and/or methods described herein may be implemented;

FIG. 2 illustrates a diagram of another exemplary device in which systems and/or methods described herein may be implemented;

FIG. 3 depicts a diagram of exemplary components of the devices illustrated in FIGS. 1 and 2;

FIG. 4 illustrates a diagram of an exemplary device arrangement in which systems and/or methods described herein may be implemented;

FIG. 5 depicts a diagram of exemplary components of the device arrangement illustrated in FIG. 4;

FIG. 6 illustrates a diagram of a backlight arrangement capable of being utilized with keypads of the devices depicted in FIGS. 1 and 2 and/or a keyboard of the device arrangement depicted in FIG. 4;

FIGS. 7A-7D depict diagrams of exemplary operations capable of being performed by the devices depicted in FIGS. 1 and 2 and/or the device arrangement illustrated in FIG. 4;

DETAILED DESCRIPTION OF PREFERRED EMBODIMENTS

Figure 7B:
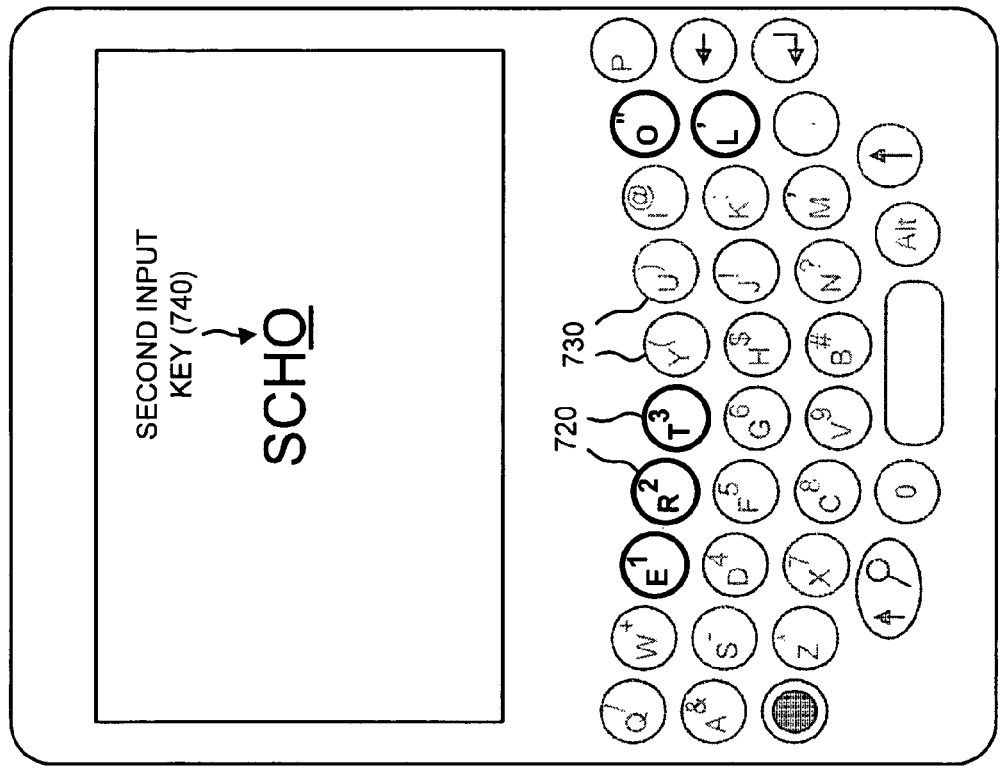

The following detailed description refers to the accompanying drawings. The same reference numbers in different drawings may identify the same or similar elements. Also, the following detailed description does not limit the invention.

Systems and/or methods described herein may provide predictive keypad/keyboard lighting that guides user input to a device (e.g., a cell phone, a PDA, a personal computer, a laptop computer, a remote control, etc.). In one implementation, for example, the systems and/or methods may receive an input key(s) (e.g., selection of a key by a user) via a keypad of a device, where the keypad is separate from a display of a device. The systems and/or methods may determine a set of predicted word(s) based on the received input key(s), may accentuate key(s) of the keypad that correspond to a character(s) provided in the set of predicted word(s), and may optionally display, on the device display, a predicted character(s) that corresponds to the character(s) provided in the set of predicted word(s). If more input key(s) are received, the systems and/or methods may repeat the aforementioned process. If no more input key(s) are received, the systems and/or methods may determine if a word associated with the received input key(s) is contained in a database associated with the device, and may store the word when the word is not contained in the device database.

As used herein, the term "user" is intended to be broadly interpreted to include a device or a user and/or owner of a device. The terms "accentuate" and "accentuating," as used herein, is to be broadly interpreted to include highlight and/or highlighting (e.g., changing a color associated with), illuminate and/or illuminating, raise and/or raising (e.g., moving upwards toward a user), lower and/or lowering (e.g., moving downwards away from a user), etc. one or more characters of a keypad. Furthermore, the terms "keypad" and "keyboard" may be used interchangeably herein.

FIG. 1 is a diagram of an exemplary device 100 in which systems and/or methods described herein may be implemented. Device 100 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a remote control (e.g., for a television), a personal gaming system, a global positioning system (GPS) unit, or other types of computation or communication devices (e.g., that may receive input from a keypad), threads or processes running on these devices, and/or objects executable by these devices.

As illustrated in FIG. 1, device 100 may include a housing 110, a speaker 120, a display 130, control buttons 140, a keypad 150, and/or a microphone 160. Housing 110 may protect the components of device 100 from outside elements. Speaker 120 may provide audible information to a user of device 100.

Display 130 may provide visual information to the user. For example, display 130 may display text input into device 100, text, images, video, and/or graphics received from another device, and/or information regarding incoming or outgoing calls or text messages, emails, media, games, phone books, address books, the current time, etc. In one exemplary implementation, if device 100 determines a set of predicted word(s) based on received input key(s), display 130 may display a predicted character(s) that correspond to character(s) provided in a set of predicted word(s).

Control buttons 140 may permit the user to interact with device 100 to cause device 100 to perform one or more operations. For example, control buttons 140 may be used to cause device 100 to transmit information. Keypad 150 may include a standard telephone keypad. Control buttons 140 and/or keypad 150 may be provided over a backlight (not shown) that illuminates control buttons 140 and/or keys of keypad 150 (e.g., during low light conditions). In one exemplary implementation, device 100 may receive an input key(s) via keypad 150, may determine a set of predicted word(s) based on the received input key(s), and may illuminate key(s) (e.g., via the backlight) of keypad 150 that correspond to a character(s) provided in the set of predicted word(s).

Microphone 160 may receive audible information from the user. For example, microphone 160 may receive audio signals from the user and may output electrical signals corresponding to the received audio signals.

Although FIG. 1 shows exemplary components of device 100, in other implementations, device 100 may contain fewer, different, differently arranged, or additional components than depicted in FIG. 1. In still other implementations, one or more components of device 100 may perform one or more other tasks described as being performed by one or more other components of user device 100.

FIG. 2 illustrates a diagram of another exemplary device 200 in which systems and/or methods described herein may be implemented. Device 200 may include a radiotelephone, a PCS terminal (e.g., that may combine a cellular radiotelephone with data processing and data communications capabilities), a PDA (e.g., that can include a radiotelephone, a pager, Internet/intranet access, etc.), a remote control (e.g., for a television), a personal gaming system, a GPS unit, or other types of computation or communication devices (e.g., that may receive input from a keypad), threads or processes running on these devices, and/or objects executable by these devices. In one implementation, device 200 may include the features described above in connection with FIG. 1 except that a keypad of device 200 may include a QWERTY-like layout (e.g., a traditional configuration of typewriter or computer keyboard keys) instead of the standard telephone keypad layout of device 100.

As illustrated in FIG. 2, device 200 may include a housing 210, a speaker 220, a display 230, control buttons 240, a keypad 250, and/or a microphone 260. Housing 210 may protect the components of device 200 from outside elements. Speaker 220 may provide audible information to a user of device 200.

Display 230 may provide visual information to the user. For example, display 230 may display text input into device 200, text, images, video, and/or graphics received from another device, and/or information regarding incoming or outgoing calls or text messages, emails, media, games, phone books, address books, the current time, etc. In one exemplary implementation, if device 200 determines a set of predicted word(s) based on received input key(s), display 230 may display a predicted character(s) that correspond to character(s) provided in a set of predicted word(s).

Control buttons 240 may permit the user to interact with device 200 to cause device 200 to perform one or more operations. For example, control buttons 240 may be used to cause device 200 to transmit information. Keypad 250 may include a QWERTY-like layout keypad. Control buttons 240 and/or keypad 250 may be provided over a backlight (not shown) that illuminates control buttons 240 and/or keys of keypad 250 (e.g., during low light conditions). In one exemplary implementation, device 200 may receive an input key(s) via keypad 250, may determine a set of predicted word(s) based on the received input key(s), and may illuminate key(s) (e.g., via the backlight) of keypad 250 that correspond to a character(s) provided in the set of predicted word(s).

Microphone 260 may receive audible information from the user. For example, microphone 260 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of user device 200.

FIG. 3 is a diagram of exemplary components of device 100 and/or device 200 (hereinafter referred to as "device 100/200"). As illustrated, device 100/200 may include a processing unit 300, memory 310, a user interface 320, a communication interface 330, and/or an antenna assembly 340.

Processing unit 300 may include one or more processors, microprocessors, application specific integrated circuits (ASICs), field programmable gate arrays (FPGAs), or the like. Processing unit 300 may control operation of device 100/200 and its components. In one implementation, processing unit 300 may control operation of components of device 100/200 in a manner described herein.

Memory 310 may include a random access memory (RAM), a read-only memory (ROM), and/or another type of memory to store data and instructions that may be used by processing unit 300.

User interface 320 may include mechanisms for inputting information to device 100/200 and/or for outputting information from device 100/200. Examples of input and output mechanisms might include buttons (e.g., control buttons 140 and/or 240, keys of keypads 150 and/or 250, a joystick, etc.); a speaker (e.g., speakers 120 and/or 220) to receive electrical signals and output audio signals; a microphone (e.g., microphones 160 and/or 260) to receive audio signals and output electrical signals; a display (e.g., displays 130 and/or 230) to output visual information (e.g., text input into device 100/200); a vibrator to cause device 100/200 to vibrate; and/or a camera to receive video and/or images.

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 100/200 may perform certain operations described herein in response to processing unit 300 executing software instructions of an application contained in a computer-readable medium, such as memory 310. A computer-readable medium may be defined as a physical or logical memory device. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 100/200, in other implementations, device 100/200 may contain fewer, different, differently arranged, or additional components than depicted in FIG. 3. In still other implementations, one or more components of device 100/200 may perform one or more other tasks described as being performed by one or more other components of device 100/200.

FIG. 4 illustrates a diagram of an exemplary device arrangement 400 in which systems and/or methods described herein may be implemented. As shown in FIG. 4, device arrangement 400 may include a computer 410, a monitor 420, and/or a keyboard 430. Computer 410, monitor 420, and/or keyboard 430 may interconnect via wired and/or wireless connections.

Computer 410 may include a laptop computer, a personal computer, a tablet computer, an ultra-mobile personal computer, or other types of computation or communication devices (e.g., that may receive input from a keyboard and/or keypad), threads or processes running on these devices, and/or objects executable by these devices.

Monitor 420 may include a device that provides visual information to a user. For example, monitor 420 may display text input into computer 410, text, images, video, and/or graphics received from another device, and/or information regarding software applications (e.g., a word processing application), emails, media, games, phone books, address books, the current time, etc. In one exemplary implementation, if computer 410 determines a set of predicted word(s) based on received input key(s), monitor 420 may display a predicted character(s) that correspond to character(s) provided in a set of predicted word(s).

Keyboard 430 may include a QWERTY-like layout keyboard. Keyboard 430 may be provided over a backlight (not shown) that illuminates keys of keyboard 430 (e.g., during low light conditions). In one exemplary implementation, computer 410 may receive an input key(s) via keyboard 430, may determine a set of predicted word(s) based on the received input key(s), and may illuminate key(s) (e.g., via the backlight) of keyboard 430 that correspond to a character(s) provided in the set of predicted word(s).

Although FIG. 4 shows exemplary components of device arrangement 400, in other implementations, device arrangement 400 may contain fewer, different, differently arranged, or additional components than depicted in FIG. 4. In still other implementations, one or more components of device arrangement 400 may perform one or more other tasks described as being performed by one or more other components of device arrangement 400.

FIG. 5 depicts a diagram of exemplary components of a device 500 that may correspond to device arrangement 400. As illustrated, device 500 may include a bus 510, a processing unit 520, a main memory 530, a ROM 540, a storage device 550, an input device 560, an output device 570, and/or a communication interface 580. Bus 510 may include a path that permits communication among the components of device 500.

Processing unit 520 may include one or more processors, microprocessors, or other types of processing units that may interpret and execute instructions. Main memory 530 may include a RAM or another type of dynamic storage device that may store information and instructions for execution by processing unit 520. ROM 240 may include a ROM device or another type of static storage device that may store static information and/or instructions for use by processing unit 520. Storage device 550 may include a magnetic and/or optical recording medium and its corresponding drive.

Input device 560 may include a mechanism that permits an operator to input information to device 500, such as a keyboard (e.g., keyboard 430), a mouse, a pen, a microphone, voice recognition and/or biometric mechanisms, a remote control, etc. Output device 570 may include a mechanism that outputs information to the operator, including a display (e.g., monitor 420), a printer, a speaker, etc. Communication interface 580 may include any transceiver-like mechanism that enables device 500 to communicate with other devices and/or systems. For example, communication interface 580 may include mechanisms for communicating with another device or system via a network.

As described herein, device 500 may perform certain operations in response to processing unit 520 executing software instructions contained in a computer-readable medium, such as main memory 530. The software instructions may be read into main memory 530 from another computer-readable medium, such as storage device 550, or from another device via communication interface 580. The software instructions contained in main memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows exemplary components of device 500, in other implementations, device 500 may contain fewer, different, differently arranged, or additional components than depicted in FIG. 5. In still other implementations, one or more components of device 500 may perform one or more other tasks described as being performed by one or more other components of device 500.

FIG. 6 illustrates a diagram of a backlight arrangement 600 capable of being utilized with keypads 150 and/or 250 of devices 100 and/or 200 and/or keyboard 430 of device arrangement 400. As shown, backlight arrangement 600 may include a backlight 600 made up of controllable light segments 620, and one or more keys 630 (e.g., of keypads 150/250 and/or keyboard 430) arranged above (or on top of) backlight 600.

Backlight 610 may include an illumination device (or light source) capable of providing illumination or light to keys 630. For example, backlight 610 may include one or more incandescent light bulbs, one or more light-emitting diodes (LEDs), an electroluminescent panel (ELP), one or more cold cathode fluorescent lamps (CCFL), one or more hot cathode fluorescent lamps (HCFL), etc. Incandescent light bulbs may be used when very high brightness is desired. LEDs may be used in small, inexpensive lighting arrangements, and may include colored or white light. An ELP may be used for larger lighting arrangements or when even lighting is desired, and may be either colored or white. CCFLs may be used in large lighting arrangements and may be white in color. In another example, backlight 610 may employ one or more diffusers or light guides to provide even lighting from an uneven source. In still another example, backlight 610 can include any color light source (e.g., yellow, green, blue, white, etc.) or any combination of colored/non-colored light sources.

In one exemplary implementation, backlight 610 may be broken up into multiple controllable light segments 620 (e.g., similar to a liquid crystal display (LCD)). One or more controllable light segments 620 may be provided under a corresponding one of keys 630, and may or may not engage a bottom surface of a corresponding one of keys 630. In one implementation, keys 630 may be integrable with one or more controllable light segments 620 (e.g., characters associated with keys 630 may be formed directly on controllable light segments 620). In another implementation, keys 630 may be provided on a touch membrane provided over one or more controllable light segments 620.

Each of controllable light segments 620 may be individually controlled (e.g., via processing unit 300 or processing unit 520) so that one or more keys 630 may be accentuated in a manner described herein. In one example, device 100/200 may receive selection (or input) of keys 630 via keypad 150/250, may determine a set of predicted word(s) based on the received input keys 630, and may illuminate one or more of keys 630 (e.g., via controllable light segments 620) of keypad 150/250 that correspond to a character(s) provided in the set of predicted word(s). In another example, computer 410 may receive selection (or input) of keys 630 via keyboard 430, may determine a set of predicted word(s) based on the received input keys 630, and may illuminate one or more of keys 630 (e.g., via controllable light segments 620) of keyboard 430 that correspond to a character(s) provided in the set of predicted word(s).

In one exemplary implementation, backlight 610 may be omitted and each of keys 630 may include an organic light emitting diode (OLED). An OLED is a LED whose emissive electroluminescent layer is composed of a film of organic compounds. The electroluminescent layer may contain a polymer substance that permits organic compounds to be deposited. An OLED may emit less light per area than an inorganic solid-state based LED. A of OLED-based displays over LCD-based displays is that OLED-based displays do not require a backlight to function.

Each of keys 630 may be associated with one or more corresponding characters (e.g., of a standard telephone keypad, of a QWERTY-like layout, etc.). Selection of one of keys 630 may cause device 100/200 and/or computer 410 to receive the one or more characters corresponding to the selected key. FIG. 6 depicts some keys 630 associated with a QWERTY-like layout, but omits other keys 630 associated with a QWERTY-like layout so that backlight 610 and controllable light segments 620 may be visible. In other implementations, keys 630 may include fewer, different, differently arranged, or additional keys 630 than depicted in FIG. 6.

Although FIG. 6 shows exemplary components of backlight arrangement 600, in other implementations, backlight arrangement 600 may contain fewer, different, differently arranged, or additional components than depicted in FIG. 6. In still other implementations, one or more components of backlight arrangement 600 may perform one or more other tasks described as being performed by one or more other components of backlight arrangement 600.

FIGS. 7A-7D depict diagrams of exemplary operations 700 capable of being performed by device 100/200 and/or device arrangement 400. Device 200 (FIG. 2) is shown in FIGS. 7A-7D for illustration purposes. In other implementations, device 100 and/or device arrangement 400 may perform exemplary operations 700 in a same or similar manner as device 200. As shown in FIG. 7A, device 200 may include display 230 and keypad 250. Display 230 and keypad 250 may include the features described above in connection with, for example, FIG. 2.

As further shown in FIG. 7A, it may be assumed that a user associated with device 200 previously provided input keys for the letters "S" and "C." If the user selects the letter "H" from keypad 250, a first input key 710 (e.g., the letter "H") may be displayed on display 230. Device 200 may receive first input key 710, may determine a set of predicted words (e.g., "SCHOOL," "SCHOTTKEY," "SCHEMA," etc.) based on the received input keys (e.g., "SCH"), and may illuminate keys (e.g., backlit keys 720) of keypad 250 that correspond to characters (e.g., "W," "E," "R," "T," "Y," "U," "I," "O," "P," "A," "J," "L," and "M") provided in the set of predicted words. For example, device 200 may energize controllable light segments 620 associated with backlit keys 720 in order to illuminate backlit keys 720. The remaining keys of keypad 250 may not be illuminated by device 200 and may be referred to as non-backlit keys 730. Non-backlit keys 730 may include keys of keypad that do not correspond to characters provided in the set of predicted words.

As shown in FIG. 7B, if the user selects the letter "O" from keypad 250, a second input key 740 (e.g., the letter "O") may be displayed on display 230. Device 200 may receive second input key 740, may determine a set of predicted words (e.g., "SCHOOL," "SCHOTTKEY," etc.) based on the received input keys (e.g., "SCHO"), and may illuminate keys (e.g., backlit keys 720) of keypad 250 that correspond to characters (e.g., "E," "R," "T," "O," and "L") provided in the set of predicted words. For example, device 200 may energize controllable light segments 620 associated with backlit keys 720 (e.g., keys corresponding to "E," "R," "T," "O," and "L") in order to illuminate backlit keys 720. The remaining keys (e.g., non-backlit keys 730) of keypad 250 may not be illuminated by device 200 since they do not correspond to characters provided in the set of predicted words.

Figure 7C:
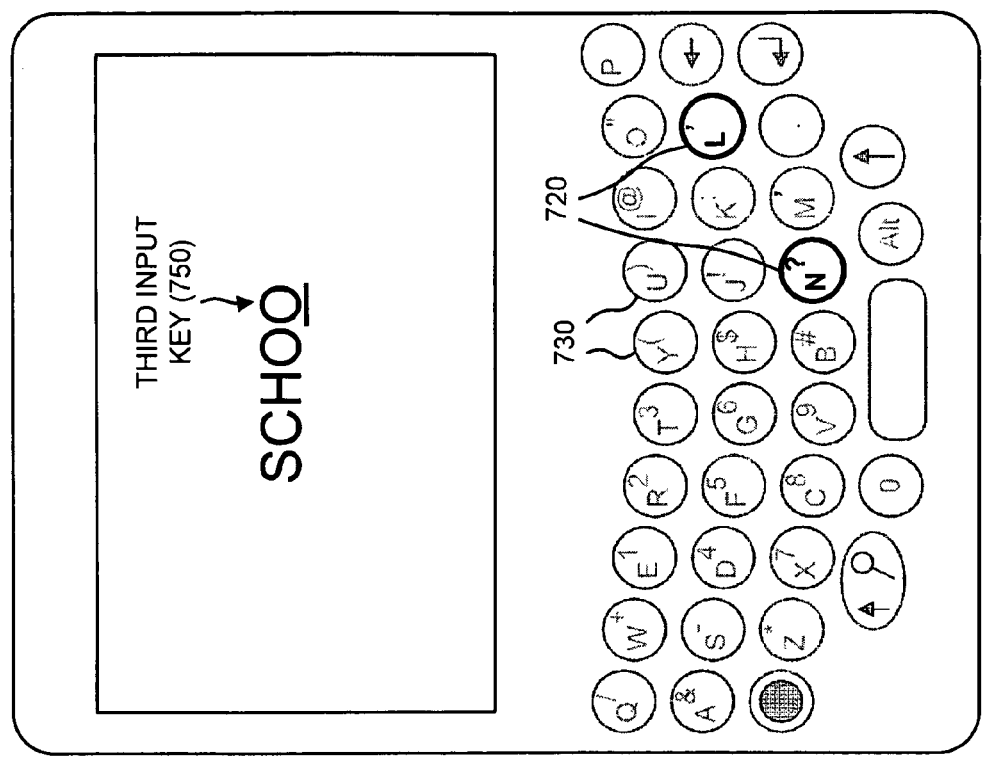

As shown in FIG. 7C, if the user selects the letter "O" from keypad 250, a third input key 750 (e.g., the letter "O") may be displayed on display 230. Device 200 may receive third input key 750, may determine a set of predicted words (e.g., "SCHOOL," "SCHOONER," etc.) based on the received input keys (e.g., "SCHOO"), and may illuminate keys (e.g., backlit keys 720) of keypad 250 that corresponds to characters (e.g., "L" and "N") provided in the set of predicted words. For example, device 200 may energize controllable light segments 620 associated with backlit keys 720 (e.g., keys corresponding to "L" and "N") in order to illuminate backlit keys 720. The remaining keys (e.g., non-backlit keys 730) of keypad 250 may not be illuminated by device 200 since they do not correspond to characters provided in the set of predicted words.

Figure 7D:
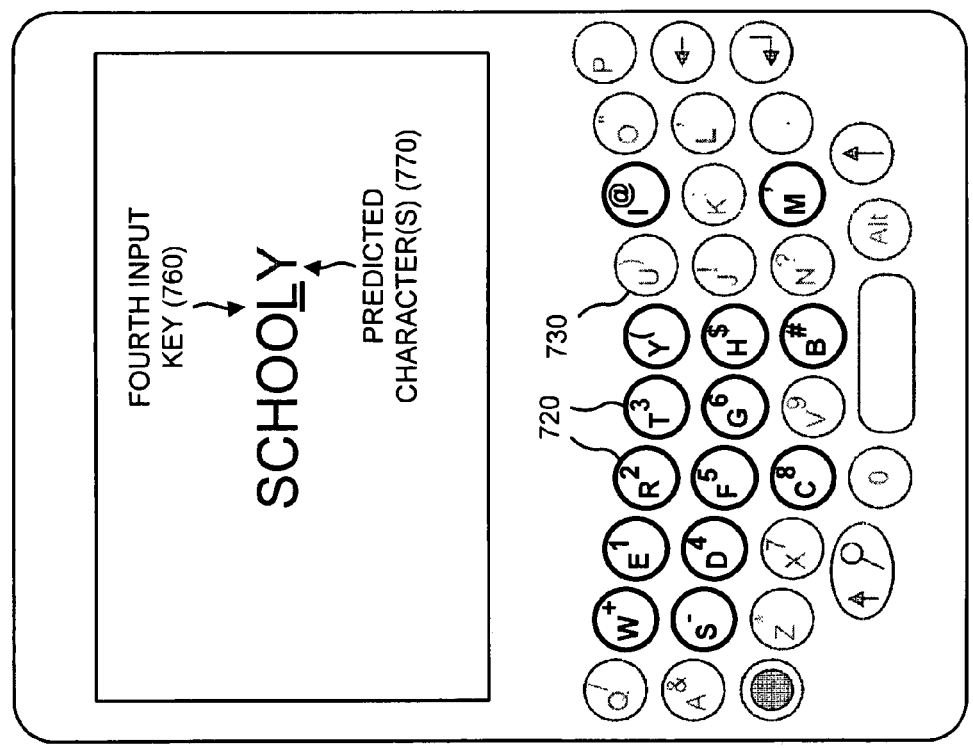

As shown in FIG. 7D, if the user selects the letter "L" from keypad 250, a fourth input key 760 (e.g., the letter "L") may be displayed on display 230. Device 200 may receive fourth input key 760, may determine a set of predicted words (e.g., "SCHOOLYARD," "SCHOOLDAY," "SCHOOLING," etc.) based on the received input keys (e.g., "SCHOOL"), and may illuminate keys (e.g., backlit keys 720) of keypad 250 that correspond to characters (e.g., "W," "E," "R," "T," "Y," "I," "S," "D," "F," "G," "H," "C," "B," and "M") provided in the set of predicted words. For example, device 200 may energize controllable light segments 620 associated with backlit keys 720 (e.g., keys corresponding to "W," "E," "R," "T," "Y," "I," "S," "D," "F," "G," "H," "C," "B," and "M") in order to illuminate backlit keys 720. The remaining keys (e.g., non-backlit keys 730) of keypad 250 may not be illuminated by device 200 since they do not correspond to characters provided in the set of predicted words. As further shown in FIG. 7D, device 200 may display (e.g., on display 230) one or more predicted characters 770 that correspond to characters provided in the set of predicted words. In one implementation, the user may select predicted characters 770 if predicted characters 770 correspond to the word the user is attempting to input into device 200.

Figure 8:
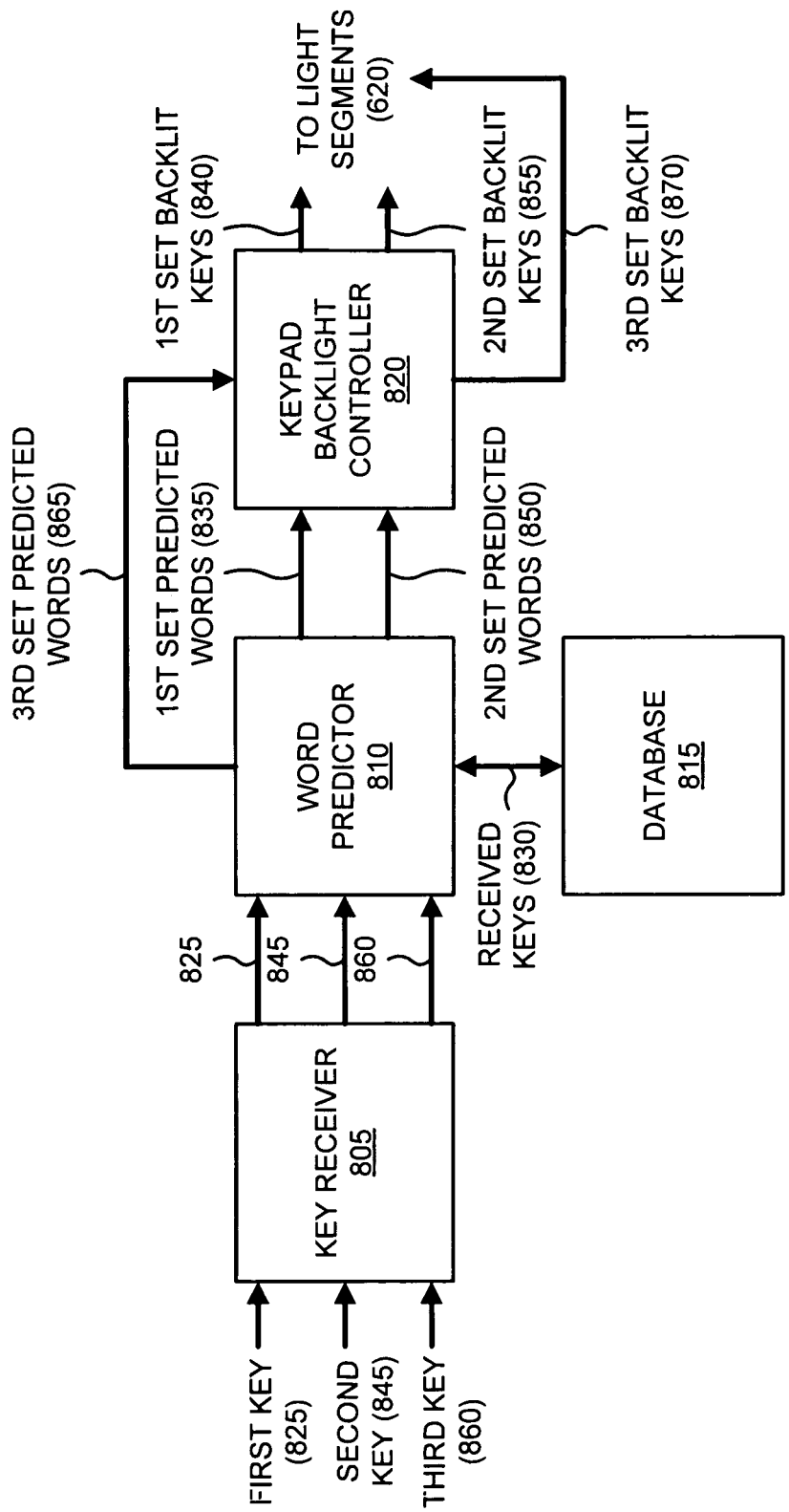
FIG. 8 illustrates a diagram of exemplary functional components of the devices depicted in FIGS. 1 and 2 and/or a computer of the device arrangement depicted in FIG. 4.

FIG. 8 illustrates a diagram of exemplary functional components of a device 800 that may correspond to device 100 (FIG. 1), device 200 (FIG. 2) and/or computer 410 (FIG. 4). As shown, device 800 may include a key receiver 805, a word predictor 810, a database 815, and/or a keypad backlight controller 820. In one implementation, the functions described in connection with FIG. 8 may be performed by processing unit 300 (FIG. 3) and/or processing unit 520 (FIG. 5).

Key receiver 805 may include any hardware, software, or combination of hardware and software that may receive a first key 825 (e.g., via selection of a key of keypad 150, keypad 250, and/or keyboard 430), and may provide first key 825 to word predictor 810. For example, as described above in connection with FIG. 7A, if the user selects the letter "H" from keypad 250, first input key 710 (e.g., the letter "H") may be displayed on display 230, and device 200 may receive first input key 710.

Word predictor 810 may include any hardware, software, or combination of hardware and software that may receive first key 825 from key receiver 805, and may provide first key 825 and any other previously received keys 830 to database 815. Word predictor 810 may interact with database 815 to determine a first set of predicted words 835 based on received keys 825/830. In one implementation, word predictor 810 may compare received keys 830 to a dictionary of words contained database 815, and may determine first set of predicted words 835 to be words contained in database 815 that match received keys 830. For example, as described above in connection with FIG. 7A, device 200 may receive first input key 710, may determine a set of predicted words (e.g., "SCHOOL," "SCHOTTKEY," "SCHEMA," etc.) based on the received input keys (e.g., "SCH"). Word predictor 810 may provide first set of predicted words 835 to keypad backlight controller 820.

Database 815 may include a storage device (e.g., memory 310, main memory 530, ROM 540, and/or storage device 550) that stores one or more dictionaries of commonly used words, language databases (e.g., alphabetic T9 language databases, foreign language databases (e.g., Chinese, Japanese, Korean, etc.)), user databases (e.g., databases of custom words entered by the user), context databases (e.g., databases that contain information about words the user has previously entered), other databases (e.g., databases that include geographic locations, stock ticker symbols, uniform resource locators (URLs), etc.), etc. In one example, database 815 may be provided in device 800. In other examples, database 815 may be provided in another device (e.g., a server in a network that communicates with device 800) separate from and communicating with device 800. In one exemplary implementation, if word predictor 810 determines that a word or words associated with received keys 830 does not match any words contained in database 815, word predictor 810 may store the non-matching word or words in database 815 (e.g., in user databases). In another exemplary implementation, database 815 may be driven by logic instead by a lookup operation (e.g., based on phonetic or linguistic rules).

Keypad backlight controller 820 may include any hardware, software, or combination of hardware and software that may receive first set of predicted words 835 from word predictor 810, and may determine a first set of backlit keys 840 that correspond to characters provided in first set of predicted words 835. Keypad backlight controller 820 may provide first set of backlit keys 840 to backlight 610, and backlight 610 may energize controllable light segments 620 (e.g., of backlight 610) corresponding to first set of backlit keys 840. The energized controllable light segments 620 may illuminate first set of backlit keys 840. For example, as described above in connection with FIG. 7A, device 200 may illuminate keys (e.g., backlit keys 720) of keypad 250 that correspond to characters provided in the set of predicted words. Device 200 may energize controllable light segments 620 associated with backlit keys 720 in order to illuminate backlit keys 720.

As further shown in FIG. 8, key receiver 805 may receive a second key 845 (e.g., via selection of a key of keypad 150, keypad 250, and/or keyboard 430), and may provide second key 845 to word predictor 810. Word predictor 810 may receive second key 845 from key receiver 805, and may provide second key 845 and previously received keys 830 to database 815. Word predictor 810 may interact with database 815 to determine a second set of predicted words 850 based on received keys 845/830. Word predictor 810 may provide second set of predicted words 850 to keypad backlight controller 820. Keypad backlight controller 820 may receive second set of predicted words 850 from word predictor 810, and may determine a second set of backlit keys 855 that correspond to characters provided in second set of predicted words 850. Keypad backlight controller 820 may utilize second set of backlit keys 855 to energize controllable light segments 620 (e.g., of backlight 610) corresponding to second set of backlit keys 855. The energized controllable light segments 620 may illuminate second set of backlit keys 855.

As still further shown in FIG. 8, key receiver 805 may receive a third key 860 (e.g., via selection of a key of keypad 150, keypad 250, and/or keyboard 430), and may provide third key 860 to word predictor 810. Word predictor 810 may receive third key 860 from key receiver 805, and may provide third key 860 and previously received keys 830 to database 815. Word predictor 810 may interact with database 815 to determine a third set of predicted words 865 based on received keys 860/830. Word predictor 810 may provide third set of predicted words 865 to keypad backlight controller 820. Keypad backlight controller 820 may receive third set of predicted words 865 from word predictor 810, and may determine a third set of backlit keys 870 that correspond to characters provided in third set of predicted words 865. Keypad backlight controller 820 may utilize third set of backlit keys 870 to energize controllable light segments 620 (e.g., of backlight 610) corresponding to third set of backlit keys 870. The energized controllable light segments 620 may illuminate third set of backlit keys 870.

Although FIG. 8 shows exemplary functional components of device 800, in other implementations, device 800 may contain fewer, different, differently arranged, or additional functional components than depicted in FIG. 8. In still other implementations, one or more functional components of device 800 may perform one or more other tasks described as being performed by one or more other functional components of device 800. For example, device 800 may optionally display (e.g., on display 130, display 230, or monitor 420) one or more predicted characters that correspond to characters provided in the sets of predicted words (e.g., first set of predicted words 835, second set of predicted words 850, and/or third set of predicted words 865). Device 800 may also determine if more keys are received by device 800. If no more keys are received by device 800, device 800 may determine if a word associated with received keys 830 is contained in database 815, and may store the word in database 815 when the word is not contained in database 815.

Figure 9:
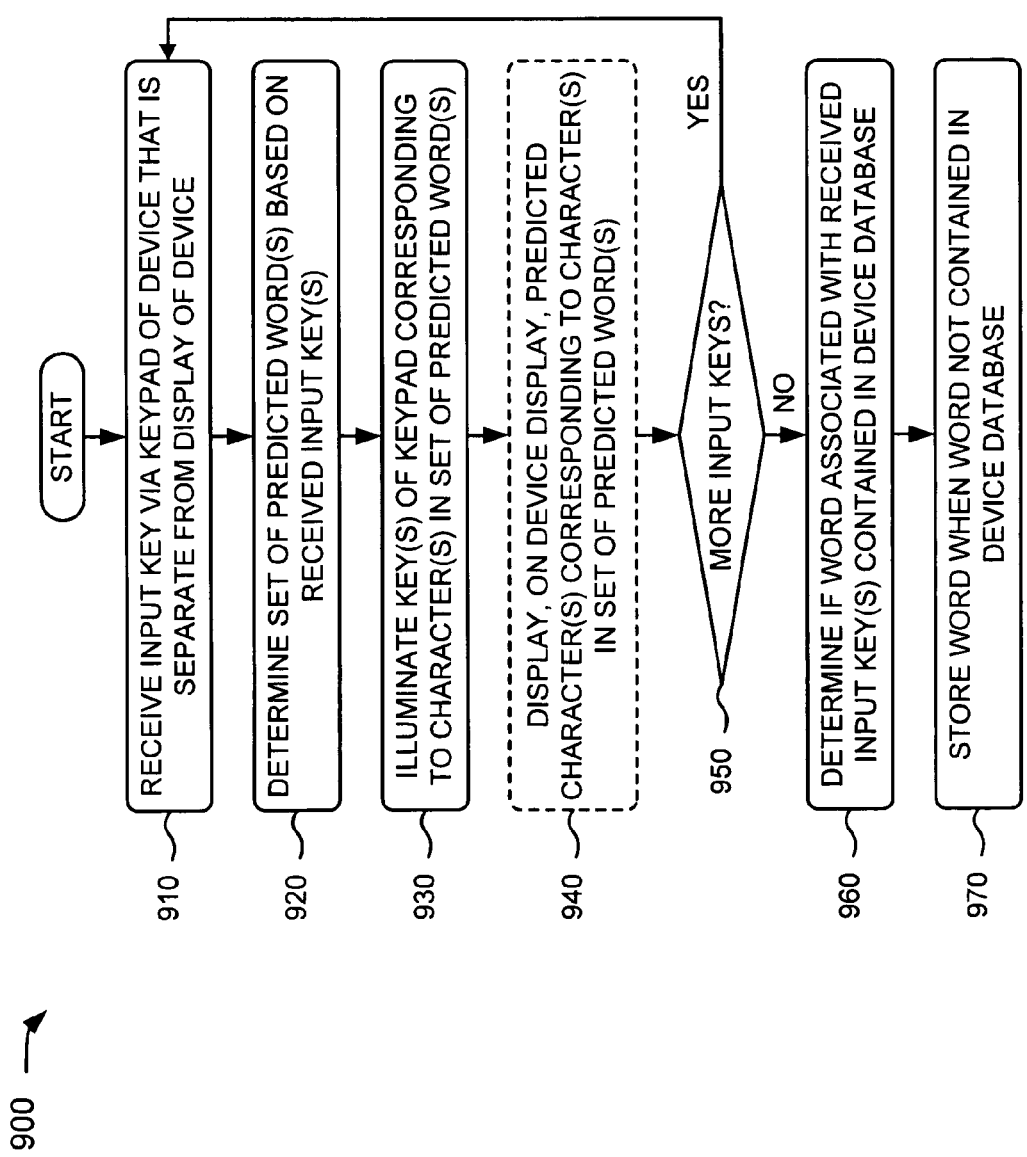
FIGS. 9-11 depict flow charts of an exemplary process for providing predictive keypad/keyboard lighting that guides user input according to implementations described herein.
Figure 10:
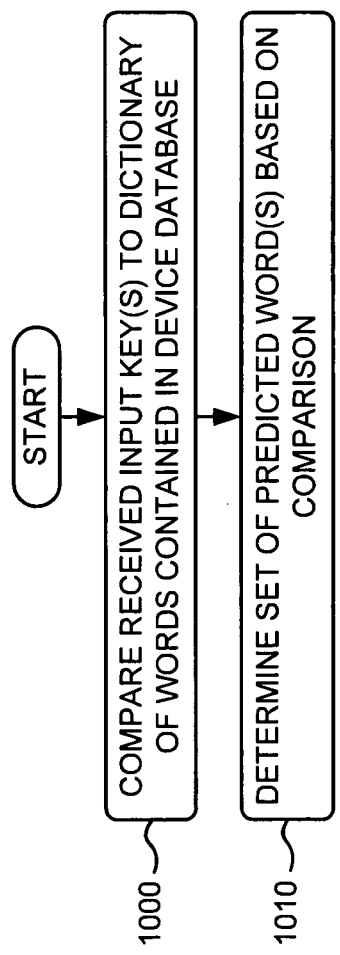
Figure 11:
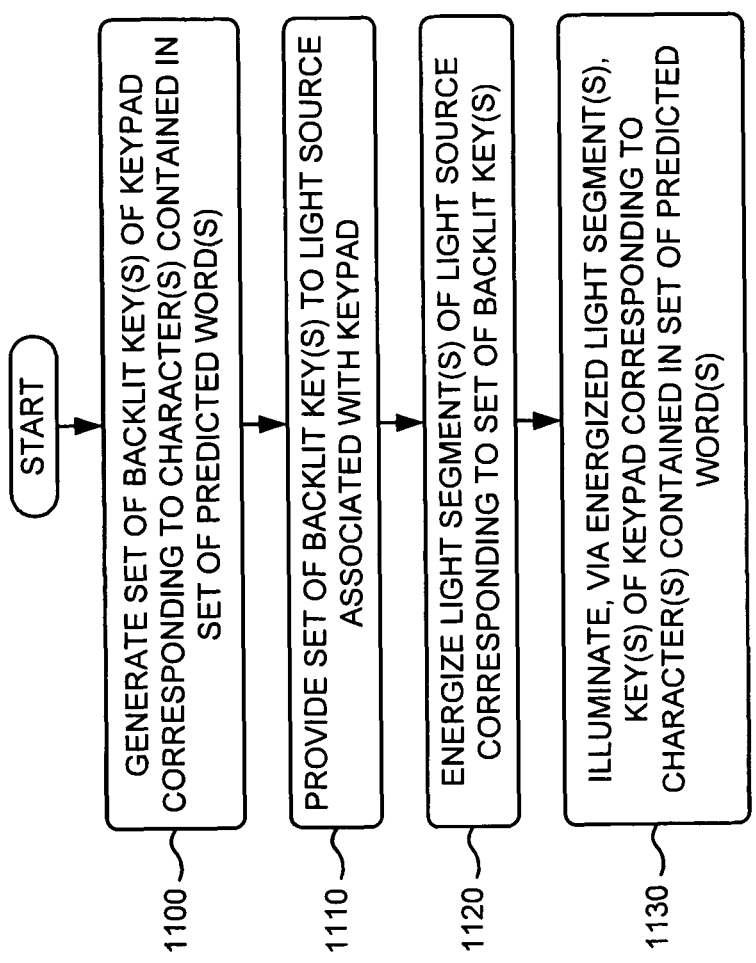

FIGS. 9-11 depict flow charts of an exemplary process 900 for providing predictive keypad/keyboard lighting that guides user input according to implementations described herein. In one implementation, process 900 may be performed by device 100, device 200, and/or device arrangement 400.

As illustrated in FIG. 9, process 900 may begin with receipt of an input key via a keypad of a device, where the keypad is separate from a display of the device (block 910), and determining a set of predicted word(s) based on received input key(s) (block 920). For example, in implementations described above in connection with FIG. 8, key receiver 805 of device 800 may receive first key 825 (e.g., via selection of a key of keypad 150, keypad 250, and/or keyboard 430), and may provide first key 825 to word predictor 810 of device 800. Word predictor 810 may receive first key 825 from key receiver 805, and may provide first key 825 and any other previously received keys 830 to database 815 associated with device 800. Word predictor 810 may interact with database 815 to determine first set of predicted words 835 based on received keys 825/830.

As further shown in FIG. 9, key(s) of the keypad corresponding to character(s) in the set of predicted word(s) may be illuminated (block 930), and predicted character(s) corresponding to the character(s) in the set of predicted word(s) may be displayed on the device display (block 940) (optional). For example, in implementations described above in connection with FIG. 8, keypad backlight controller 820 of device 800 may receive first set of predicted words 835 from word predictor 810, and may determine first set of backlit keys 840 that correspond to characters provided in first set of predicted words 835. Keypad backlight controller 820 may utilize first set of backlit keys 840 to energize controllable light segments 620 (e.g., of backlight 610) corresponding to first set of backlit keys 840. The energized controllable light segments 620 may illuminate first set of backlit keys 840. Device 800 may optionally display (e.g., on display 130, display 230, or monitor 420) one or more predicted characters that correspond to characters provided in the sets of predicted words.

Returning to FIG. 9, if more input key(s) are received by the device (block 950—YES), process 900 may return to process block 910 and may repeat process blocks 910-940. Otherwise (block 950—NO), it may be determined if a word associated with the received input key(s) is contained in a database associated with the device (block 960), and the word may be stored in the device database when the word is not contained in the device database (block 970). For example, in implementations described above in connection with FIG. 8, device 800 may also determine if more keys are received by device 800. If word predictor 810 of device 800 determines that a word or words associated with received keys 830 does not match any words contained in database 815 of device 800, word predictor 810 may store the non-matching word or words in database 815 (e.g., in user databases).

Process block 920 may include the process blocks illustrated in FIG. 10. As shown in FIG. 10, process block 920 may include comparing the received input key(s) to a dictionary of words contained in the device database (block 1000), and determining the set of predicted word(s) based on the comparison (block 1010). For example, in implementations described above in connection with FIG. 8, word predictor 810 of device 800 may compare received keys 830 to a dictionary of words contained database 815 of device 800, and may determine first set of predicted words 835 to be words contained in database 815 that match received keys 830.

Process block 930 may include the process blocks illustrated in FIG. 11. As shown in FIG. 11, process block 930 may include generating a set of backlit key(s) of the keypad that correspond to character(s) contained in the set of predicted word(s) (block 1100), and providing the set of backlit key(s) to a light source associated with the keypad (1110). For example, in implementations described above in connection with FIG. 8, keypad backlight controller 820 of device 800 may receive first set of predicted words 835 from word predictor 810, and may determine first set of backlit keys 840 that correspond to characters provided in first set of predicted words 835. Keypad backlight controller 820 may provide first set of backlit keys 840 to backlight 610 of device 800.

As further shown in FIG. 11, process block 930 may include energizing light segment(s) of the light source that correspond to the set of backlit key(s) (block 1120), and illuminating, via the energized light segment(s), key(s) of the keypad that correspond to character(s) contained in the set of predicted word(s) (block 1130). For example, in implementations described above in connection with FIG. 8, backlight 610 may energize controllable light segments 620 (e.g., of backlight 610) corresponding to first set of backlit keys 840. The energized controllable light segments 620 may illuminate first set of backlit keys 840 that correspond to characters provided in first set of predicted words 835.

Systems and/or methods described herein may provide predictive keypad/keyboard lighting that guides user input to a device. In one implementation, for example, the systems and/or methods may receive an input key(s) via a keypad of a device, where the keypad is separate from a display of a device. The systems and/or methods may determine a set of predicted word(s) based on the received input key(s), may illuminate key(s) of the keypad that correspond to a character(s) provided in the set of predicted word(s), and may optionally display, on the device display, a predicted character(s) that corresponds to the character(s) provided in the set of predicted word(s). If more input key(s) are received, the systems and/or methods may repeat the aforementioned process. If no more input key(s) are received (e.g., which may indicate an end of a word, as designated by a space or a punctuation mark), the systems and/or methods may determine if a word associated with the received input key(s) is contained in a database associated with the device, and may store the word when the word is not contained in the device database.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 9-11, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a computing device and via a keypad associated with the computing device, information identifying one or more inputs,
        the keypad corresponding to a mechanical keypad that is separate from a display associated with the computing device,
        the keypad including a plurality of physical keys,
            each key, of the plurality of physical keys, corresponding to a respective character,
            the one or more inputs corresponding to a selection of one or more keys, of the plurality of physical keys, to cause one or more characters to be provided for presentation on the display, and
            each key, of the plurality of physical keys, corresponding to a respective set of controllable light segments capable of illuminating the key,
                the respective set of controllable light segments, for each key of the plurality of physical keys, being separately controllable from the respective set of controllable light segments for each other key of the plurality of physical keys, and
        the keypad and the display being connected via one or more wired or wireless connections;
    determining, by the computing device, the one or more characters that correspond to the one or more inputs;
    providing, by the computing device, the one or more characters for presentation on the display;
    determining, by the computing device, a predicted word based on the one or more characters;
    determining, by the computing device, one or more predicted characters included in the predicted word,
        the predicted word including the one or more characters and the one or more predicted characters, and
        the one or more predicted characters corresponding to a plurality of additional inputs necessary to complete the predicted word;
    determining, by the computing device, a particular key, of the plurality of physical keys of the keypad, that corresponds to a predicted character of the one or more predicted characters;
    identifying, by the computing device, the respective set of controllable light segments that corresponds to the particular key; and
    energizing, by the computing device, the respective set of controllable light segments to illuminate the particular key.

2. The method of claim 1, further comprising:
    providing, for presentation on the display, one or more of the one or more predicted characters.

3. The method of claim 1, further comprising:
    receiving information identifying at least one more input after a user selects one or more of the particular key or one or more other keys of the plurality of physical keys;
    determining whether a word that includes characters corresponding to the one or more inputs and the at least one more input is stored in a storage device associated with the computing device; and
    storing the word in the storage device when the word is not stored in the storage device.

4. The method of claim 1, where determining the predicted word comprises:
    determining the predicted word by comparing the one or more characters with a dictionary of words stored in a storage device of the computing device.

5. The method of claim 1, where determining the predicted word comprises:
    using a Text on 9 keys (T9) predictive text dictionary to determine the predicted word based on the one or more characters.

6. The method of claim 1,
    where the one or more characters and the one or more predicted characters include all characters that are in the predicted word.

7. The method of claim 1, where the respective set of controllable light segments is part of a backlight that includes a combination of colored and non-colored light sources.

8. The method of claim 1, where the respective set of controllable light segments is provided under and not engaging the particular key.

9. A system comprising:
    a keyboard that includes a plurality of physical keys,
        each key, of the plurality of physical keys, corresponding to a respective character,
        each key, of the plurality of physical keys, corresponding to a respective set of controllable light segments capable of illuminating the key,
            the respective set of controllable light segments, for each key of the plurality of physical keys, being separately controllable from the respective set of controllable light segments for each other key of the plurality of physical keys, and
        the keyboard being physically separate from a display associated with the system; and
    one or more processors to:
        receive information identifying one or more inputs via the keyboard,
        determine one or more characters that correspond to the one or more inputs,
        provide, for presentation on the display, the one or more characters,
        determine a predicted word based on the one or more characters,
        determine one or more predicted characters that are included in the predicted word,
            the predicted word including the one or more characters and the one or more predicted characters, and
            the one or more predicted characters corresponding to a plurality of additional inputs necessary to complete the predicted word,
        determine a particular key, of the plurality of physical keys of the keyboard, that corresponds to a predicted character of the one or more predicted characters,
        identify the respective set of controllable light segment that corresponds to the particular key, and
        energize the respective set of controllable light segments to illuminate the particular key.

10. The system of claim 9, where the one or more processors are further to:
    provide, for presentation on the display, one or more of the one or more predicted characters.

11. The system of claim 9, where the one or more processors are further to:
    receive information identifying at least one more input after a selection of the particular key or one or more other keys of the plurality of physical keys,
    determine if a word that includes characters corresponding to the one or more inputs and the at least one more input is stored in a storage device of the system, and store the word in the storage device when the word is not stored in the storage device.

12. The system of claim 9, where, when determining the predicted word, the one or more processors are to:
determine the predicted word by comparing the one or more characters corresponding to the one or more inputs with a dictionary of words stored in a storage device of the system.

13. The system of claim 9, where, when determining the predicted word, the one or more processors are to:
use a Text on 9 keys (T9) predictive text dictionary to determine the predicted word based on the one or more characters.

14. The system of claim 9, where the particular key is provided on a touch membrane formed over the respective set of controllable light segments.

15. The system of claim 9,
where the keyboard is provided on a touch membrane, and
where the touch membrane is provided over a backlight that includes the respective set of controllable light segments.

16. A non-transitory computer-readable medium storing instructions, the instructions comprising:
one or more instructions that, when executed by at least one processor, cause the at least one processor to:
receive information identifying one or more inputs via a keyboard,
the keyboard being separate from a display,
the keyboard including a plurality of physical keys,
each key, of the plurality of physical keys, corresponding to a respective character,
the one or more inputs corresponding to a selection of one or more keys, of the plurality of physical keys, to cause one or more characters to be provided for presentation on the display, and
each key, of the plurality of physical keys, corresponding to a respective set of controllable light segments capable of illuminating the key,
the respective set of controllable light segments, for each key of the plurality of physical keys, being separately controllable from the respective set of controllable light segments for each other key of the plurality of physical keys, and
the keyboard and the display being connected via one or more wired or wireless connections;
determine the one or more characters that correspond to the one or more inputs;
provide, for presentation on the display, the one or more characters;
determine a predicted word based on the one or more characters;
determine one or more predicted characters that are included in the predicted word,
the predicted word including the one or more characters and the one or more predicted characters, and
the one or more predicted characters corresponding to a plurality of additional inputs necessary to complete the predicted word;
determine a particular key, of the plurality of physical keys of the keyboard, that corresponds to a predicted character of the one or more predicted characters;
identify the respective set of controllable light segments that corresponds to the particular key; and
energize the respective set of controllable light segments to illuminate the particular key.

17. The non-transitory computer-readable medium of claim 16, where the one or more characters that correspond to the one or more inputs and the one or more predicted characters include all letters that are in the predicted word.

18. The non-transitory computer-readable medium of claim 16, where the respective set of controllable light segments includes an organic light emitting diode (OLED).

19. The non-transitory computer-readable medium of claim 16, where the respective set of controllable light segments includes a light emitting diode (LED).

20. The non-transitory computer-readable medium of claim 16, where the keyboard is provided on a touch membrane.

21. The non-transitory computer-readable medium of claim 16, where the respective set of controllable light segments is included in a backlight that is broken up into the respective set of controllable light segments.

* * * * *